(12) United States Patent
Gautam et al.

(10) Patent No.: US 10,059,594 B2
(45) Date of Patent: Aug. 28, 2018

(54) METHOD AND APPARATUS FOR PRODUCING HIGH PURITY PHOSGENE

(71) Applicant: SABIC Global Technologies B.V., Bergen op Zoom (NL)

(72) Inventors: Pankaj Singh Gautam, Evansville, IN (US); William E. Hollar, Jr., Mount Vernon, IN (US)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 0 days.

(21) Appl. No.: 14/907,383

(22) PCT Filed: Jul. 25, 2014

(86) PCT No.: PCT/US2014/048244
§ 371 (c)(1),
(2) Date: Jan. 25, 2016

(87) PCT Pub. No.: WO2015/013644
PCT Pub. Date: Jan. 29, 2015

(65) Prior Publication Data
US 2016/0207779 A1 Jul. 21, 2016

Related U.S. Application Data

(60) Provisional application No. 61/859,156, filed on Jul. 26, 2013.

(51) Int. Cl.
*B01J 8/06* (2006.01)
*C01B 31/28* (2006.01)

(52) U.S. Cl.
CPC .............. *C01B 31/28* (2013.01); *B01J 8/067* (2013.01); *B01J 2208/0084* (2013.01); *B01J 2208/00212* (2013.01); *B01J 2208/00513* (2013.01); *B01J 2208/025* (2013.01); *B01J 2208/065* (2013.01)

(58) Field of Classification Search
CPC .......... C01B 31/28; C01B 32/80; B01J 8/067; B01J 2208/00212; B01J 2208/00513; B01J 2208/0084; B01J 2208/065; B01J 2208/025; B01J 8/06
See application file for complete search history.

(56) References Cited

U.S. PATENT DOCUMENTS

| | | | |
|---|---|---|---|
| 3,857,680 A | 12/1974 | Porta et al. | |
| 4,016,190 A | 4/1977 | Bockmann et al. | |
| 4,697,034 A | 9/1987 | Janatpour et al. | |
| 4,792,620 A * | 12/1988 | Paulik | B01J 31/0231 560/232 |
| 5,136,077 A | 8/1992 | Rand | |
| 5,167,946 A | 12/1992 | Mullins et al. | |
| 5,239,105 A | 8/1993 | Pews et al. | |
| 5,424,473 A | 6/1995 | Galvan et al. | |
| 5,478,961 A | 12/1995 | Ooms et al. | |
| 5,734,004 A | 3/1998 | Kuhling et al. | |
| 5,900,501 A | 5/1999 | Ooms et al. | |
| 6,054,612 A | 4/2000 | Cicha et al. | |
| 6,348,613 B2 | 2/2002 | Miyamoto et al. | |
| 6,399,823 B1 * | 6/2002 | Via | B01J 8/0453 502/177 |
| 6,410,678 B1 | 6/2002 | Ishida et al. | |
| 6,500,984 B1 | 12/2002 | Via et al. | |
| 6,531,623 B2 | 3/2003 | Chrisochoou et al. | |
| 6,548,691 B2 | 4/2003 | Alewelt et al. | |
| 6,680,400 B2 | 1/2004 | Alewelt et al. | |
| 6,930,202 B1 | 8/2005 | Heuser et al. | |
| 6,977,066 B1 | 12/2005 | Iwanaga et al. | |
| 7,378,540 B2 | 5/2008 | Ryu | |
| 7,442,835 B2 | 10/2008 | Keggenhoff et al. | |
| 7,771,674 B2 | 8/2010 | Suzuta et al. | |
| 7,812,189 B2 | 10/2010 | Fukuoka et al. | |
| 8,044,226 B2 | 10/2011 | Fukuoka et al. | |
| 8,409,539 B2 | 4/2013 | Olbert et al. | |
| 8,518,231 B2 | 8/2013 | Ooms et al. | |
| 8,993,803 B2 * | 3/2015 | Olbert | C01B 31/28 562/847 |
| 9,175,135 B2 * | 11/2015 | Ooms | C01B 7/04 |
| 2005/0014965 A1 | 1/2005 | Dahlmann et al. | |
| 2009/0143619 A1 | 6/2009 | Kauth et al. | |
| 2016/0176715 A1 | 6/2016 | Gautam et al. | |

FOREIGN PATENT DOCUMENTS

| | | |
|---|---|---|
| CN | 101545579 A | 9/2009 |
| CN | 102814188 A | 12/2012 |
| DE | 102006022629 A1 | 11/2007 |

(Continued)

OTHER PUBLICATIONS

Norskov et al, Nature Chemistry, Towards the Computational Design of Solid Catalysts, 2009, 1, pp. 37-46. (Year: 2009).*
English Abstract of EP 0483632; Date of Publication May 6, 1992; 1 page.
Albanis et al.; "Theodoros Albanis and Evcoxia Kladopoulou, Hellenic Petroleum A Heat Exchanger for Texas Tower Feed/Effluent Applications Aided the Upgrade Project of the Hellenic Petroleum Refinery at Thessaloniki"; Hydrocarbon Engineering; Feb. 2.
International Search Report for International Application No. PCT/US2014/048244; International Filing Date: Jul. 25, 2014; dated Oct. 23, 2014; 5 pages.

(Continued)

Primary Examiner — Paul A Zucker
(74) Attorney, Agent, or Firm — Cantor Colburn LLP

(57) ABSTRACT

In an embodiment, a method of producing phosgene in a tube reactor comprises introducing a feed comprising carbon monoxide and chlorine to a tube of the reactor, the tube having a particulate catalyst disposed therein, wherein a thermally conductive material separate from the tube contacts at least a portion of the particulate catalyst; to produce a product composition comprising phosgene, and carbon tetrachloride in an amount of 0 to 10 ppm by volume based on the volume of the phosgene.

20 Claims, No Drawings

(56) References Cited

FOREIGN PATENT DOCUMENTS

| | | |
|---|---|---|
| EP | 0633241 A1 | 1/1995 |
| EP | 0722931 A1 | 7/1996 |
| EP | 0796819 A1 | 9/1997 |
| EP | 0936184 A2 | 8/1999 |
| EP | 1033167 A2 | 9/2000 |
| EP | 1112997 A2 | 7/2001 |
| EP | 1234845 A2 | 8/2002 |
| EP | 1633172 A2 | 3/2006 |
| EP | 1783112 A1 | 5/2007 |
| FR | 2003931 A1 | 11/1969 |
| JP | 61118349 A | 6/1986 |
| JP | 02180925 A | 12/1988 |
| JP | 09012507 A | 6/1995 |
| JP | 2001348364 A | 12/2001 |
| JP | 2002020351 A | 1/2002 |
| JP | 2012218976 A | 11/2012 |
| WO | 9730932 | 8/1997 |
| WO | 2012076532 A1 | 6/2012 |
| WO | 2015119981 A2 | 8/2015 |
| WO | 2015119982 A2 | 8/2015 |

OTHER PUBLICATIONS

Naphon et al.; "A review of flow and heat transfer characteristics in curved tubes"; Renewalbe and Sustainable Energy Reviews; 10 (2006); pp. 463-490.

Written Opinion of the International Search Report for International Application No. PCT/US2014/048244; International Filing Date: Jul. 25, 2014; dated Oct. 23, 2014; 8 pages.

Norskov et al., "Towards the Computational Design of Solid Catalysts", Nature Chemistry; Jan. 2009, pp. 37-46.

* cited by examiner

METHOD AND APPARATUS FOR PRODUCING HIGH PURITY PHOSGENE

CROSS REFERENCE TO RELATED APPLICATIONS

This application is a National Stage application of PCT/US2014/0482244, filed Jul. 25, 2014, which claims the benefit of U.S. Provisional Application No. 61/859,156, filed Jul. 26, 2013; which are incorporated by reference in their entirety herein.

BACKGROUND

Phosgene (also known as carbonyl chloride or carbonyl dichloride) finds use in the preparation of organic compounds, monomers, and polymers, such as carbonates, isocyanates, ureas, chloroformates, carbamates, polyurethanes, and polycarbonates. In one method for producing phosgene, carbon monoxide is reacted with chlorine in the presence of a carbon-comprising catalyst such as activated carbon or silicon carbide. The reaction is strongly exothermic and is usually performed in a reactor such as a multi-tubular reactor that has been designed similarly to conventional shell and tube heat exchangers.

A carbon tetrachloride by-product can result from the phosgene reaction and can be present in an amount of 50 to 300 parts per million (ppm) by volume or higher. The presence of carbon tetrachloride in the reactor can disadvantageously result in depletion of the catalyst. Furthermore, the presence of such high levels of carbon tetrachloride is disadvantageous in several applications where the level of carbon tetrachloride in phosgene needs to be less than or equal to 10 ppm by volume before use of the phosgene.

Phosgene purification to remove carbon tetrachloride can be difficult and is a significant part of capital investment and operating costs of any phosgene plant due to the costly material of construction of the purification equipment, the need for large enclosures to house said equipment, and further because the process is very energy intensive. On a global basis, the amount of byproduct carbon tetrachloride produced in commercial phosgene manufacture annually can be as much as 2 million kilograms based on phosgene production of about 4 billion kilograms.

A method to produce purified phosgene without the need for a separate purification process is therefore desirable.

BRIEF SUMMARY

Disclosed is a method of producing phosgene, the method comprising reacting carbon monoxide and chlorine in a reactor in the presence of a catalyst to produce a product composition comprising phosgene and carbon tetrachloride, wherein reacting is under conditions effective to provide carbon tetrachloride in an amount of 0 to 10 ppm by volume, based on the total volume of the product composition.

In another embodiment, a reactor for the manufacture of phosgene comprising less than 10 ppm by volume of carbon tetrachloride comprises a reactor having a heat transfer area per unit volume of 500 to 10,000 $m^2/m^3$ located at the feed end of a middle reactor and an end reactor located at the outlet end of the middle reactor.

Also disclosed is a method of producing phosgene in a tube reactor, the method comprising: introducing a feed comprising carbon monoxide and chlorine to a tube of the reactor, the tube having a particulate catalyst disposed therein, wherein a thermally conductive material separate from the tube contacts at least a portion of the particulate catalyst; to produce a product composition comprising phosgene, and carbon tetrachloride in an amount of 0 to 10 ppm by volume based on the volume of the phosgene.

A tube reactor comprises a shell and a tube located within the shell, with a cooling medium between the shell and the tube, the tube having a particulate catalyst effective to convert carbon monoxide and chlorine to phosgene disposed therein, wherein a thermally conductive material separate from the tube contacts at least a portion of the particulate catalyst.

The above described and other features are exemplified by the following Detailed Description and Examples.

DETAILED DESCRIPTION

Phosgene is typically produced in packed bed multi-tubular reactors. A typical multi-tubular reactor for use as a phosgene reactor consists of a shell housing a number of tubes packed with a catalyst and a cooling medium circulating between the tubes and the shell to remove the heat of the reaction. Because typical catalysts have poor thermal conductivity and the multi-tubular design of the reactor is limited in terms of effective heat transfer area, the reactor can have high peak tube temperatures (hot spots) in the range of 400 to 800 degrees Celsius (° C.). It was surprisingly found that the formation of carbon tetrachloride is directly related to the peak reaction temperature in the packed bed, and without being bound by theory, it is believed that the formation of carbon tetrachloride primarily occurs in these hot spots. Specifically, experiments were performed in a laboratory-scale phosgene reactor where the peak reactor temperature versus the amount of carbon tetrachloride was determined, and a transfer function was developed to relate the peak reactor temperature to the amount of carbon tetrachloride ([$CCl_4$] in parts per million by volume) in the resultant phosgene. The resultant transfer function is shown in the following Equation 1.

$$\ln [CCl_4] \text{ (ppm)} = 0.012 T_{peak}(K) - 3.88 \quad (1)$$

Equation 1 predicts that the amount of carbon tetrachloride in the phosgene is reduced in an exponential manner as the peak temperature, $T_{peak}$ in Kelvin, decreases.

It was therefore surprisingly found that reducing or eliminating the formation of hot spots in the phosgene reactor such that the peak reaction temperature is less than 800° C., specifically, less than or equal to 400° C., more specifically, less than or equal to 350° C., even more specifically, less than or equal to 300° C. could result in the formation of phosgene with less than or equal to 10 ppm, less than or equal to 9 ppm, less than or equal to 8 ppm, less than or equal to 7 ppm, less than or equal to 6 ppm, less than or equal to 5 ppm, less than or equal to 4 ppm, less than or equal to 3 ppm, less than or equal to 2 ppm, less than or equal to 1 ppm, or 0 ppm, by volume of carbon tetrachloride. The peak reaction temperature can be less than 400° C. The Applicants have therefore developed a process and a reactor that could reduce or prevent formation of hot spots by increasing available heat transfer area per unit volume of the reactor. For example, a typical commercial multi-tubular phosgene reactor has an effective heat transfer area per unit volume of the order of 100 meters squared per meters cubed ($m^2/m^3$). Use of a modified reactor design to increase wall contact area per unit volume to increase bed-to-reactor wall heat transfer is illustrated in the various embodiments described below. It was surprisingly found that by replacing or modifying such multi-tubular reactors with a reactor configuration that better facilitates heat removal, the concentration of carbon tetrachloride can be reduced. In an embodiment, the reactor is a tube reactor having a heat transfer area per unit volume of 500 to 10,000 $m^2/m^3$, 750 to 8,000 $m^2/m^3$, or 1,000 to 5,000 $m^2/m^3$. At least one of the following techniques can be used to achieve high heat transfer rates to mitigate or eliminate hot spot formation that contributes to higher levels of carbon tetrachloride in phosgene: a) use of a modified reactor design having an order of magnitude greater heat transfer area per unit volume as compared with conventional multi-tubular reactors, for example, a heat transfer area per unit volume of 500 to 10,000 $m^2/m^3$; and b) use of a modified reactor design to increase wall contact area per unit volume to increase bed-to-reactor wall heat transfer.

To achieve these results, a tube that contains the catalyst is modified to provide improved thermal conduction away from the catalyst. In particular, a thermally conductive material separate from the tube contacts at least a portion of the particulate catalyst. In other words, a conductive material (that is not a wall or other component of a convection tube) contacts the particulate catalyst to improve thermal conduction away from the catalyst or to increase the thermal conductivity of the catalyst itself.

The thermally conductive material can contact at least a portion of an exterior of the particulate catalyst. The thermally conductive material can provide a thermally conductive path between the particulate catalyst and the tube. The path can be continuous or broken. A plurality of continuous paths can be present.

For example, the thermally conductive material can be a coating disposed on at least a portion of an exterior surface of the particulate catalyst, i.e., on at least a portion of the catalyst particles or on at least a portion of the exterior surface of agglomerates of the catalyst particles, or both. As used herein, "exterior surface" of the particulate catalyst does not include the pore openings, or the surfaces of the pores themselves. Contact between the thermally conductive coating on the exterior surfaces of the catalyst particles or agglomerates of the catalyst particles can provide a thermally conductive pathway from the particles or agglomerates and the tube. Even where the path is not continuous to the tube wall, such inter-particle or inter-agglomerate contact can better dissipate heat within the catalyst bed and thus decrease or prevent hot spots in the bed.

The coating can be continuous or discontinuous over the exterior surfaces. The thermally conductive coating can have a coating thickness of 0.001 to 1 micrometer, specifically, 0.01 to 0.1 micrometer, depending on the material used and the desired level of conductivity. The coating thickness can be uniform or can vary. Methods for the deposition of such coatings can be, for example, chemical vapor deposition, thermal spraying, dip coating, or powder coating. The particular method is selected in part to decrease, minimize, or prevent substantial blocking of the catalyst pore openings or coating of the pore surfaces. It is to be understood that some blocking of the catalyst pore openings or coating of the pore surfaces can occur without significantly adversely affecting the activity of the catalyst.

A plurality of continuous paths can be provided by a thermally conductive, 3-dimensional mesh disposed within a packed catalyst bed and contacting at least a portion of the exterior surfaces of the catalyst particles or agglomerates. The mesh openings can have any configuration (round, oval, square, rectangular, or the like) and the sizes of the openings are selected to provide the desired degree of contact and thermal conductivity. The mesh can be regular, for example, woven, or irregular, for example, a nonwoven felt. Generally the openings can have an average diameter larger than the average diameter of the particulate catalyst.

A plurality of continuous, thermally conductive paths can be provided by intermixing a thermally conductive particulate material with the particulate catalyst. The thermally conductive particulate material and the particulate catalyst can be disposed in the reactor as a packed bed, or disposed on a wall of the reactor. The thermally conductive particulate material can be of any shape, including irregular or regular, e.g., spherical, oval, and the like, and of any size, although the average diameter of the thermally conductive particulate material can be within ±20% or ±10% of the average diameter of the catalyst particles or agglomerates of catalyst particles. The shape and size are selected to provide close packing with the particulate catalyst. The thermally conductive particulate material can be randomly distributed or distributed in a pattern. Even where the thermally conductive particulate material does not provide a continuous path to a surface of the tube, it can function to spread heat within the bed and thus decrease, minimize, or eliminate hot spots in the reactor, e.g., as compared to beds that do not employ the thermally conductive particulate material.

A sheet of a thermally conductive mesh can be placed in the packed bed or over the wall to maintain the thermally conductive particles in place, where the average diameter of the openings of the mesh are smaller than the average diameter of the thermally conductive particulate material. Alternatively, a thermally conductive, 3-dimensional mesh as described above can be disposed within a packed catalyst bed containing the particulate thermally conductive material and the particulate catalyst to provide thermally conductive paths.

Another method to increase the thermal conductivity of the catalyst is to increase the level of thermally conductive materials within the catalyst itself. Carbon catalysts, for example, can inherently contain one or more thermally conductive materials in a total amount 1,000 ppm or less by weight of the catalyst. Increasing the level of thermally conductive materials to 10,000 ppm or more by weight, or 100,000 ppm or more by weight can increase contact between a thermally conductive material and the catalyst, and thereby increase the thermal conductivity of the catalyst. The amount of doped thermally conductive materials is preferably below a level that significantly adversely affects catalyst activity or product purity. Even where the presence of doped thermally conductive materials do not provide a continuous path to a surface of the tube, it can function to spread heat within the catalyst bed and thus decrease, minimize, or eliminate hot spots in the reactor.

Any combination of the above-described methods can be used, for example, a combination of coated particulate catalyst, and particulate thermally conductive material, optionally together with a thermally conductive doped catalyst.

A wide variety of thermally conductive materials can be used having a thermal conductivity greater than 2 Watts per meter per degree Kelvin (W/(m·K)), greater than 15 W/(m·K), greater than 50 W/(m·K), or greater than 100 W/(m·K). The thermally conductive material can have a thermal conductivity greater than 200 W/(m·K). Examples of such thermally conductive materials include aluminum, aluminum brass, aluminum oxide, antimony, beryllium, beryllium oxide, brass, bronze, cadmium, carbon nanotubes, graphene, carbon steel, copper, gold, iridium, iron, lead, magnesium, molybdenum, nickel, silver, steel, stainless steel, and Chrome Nickel Steel (18 wt % Cr, 8 wt % Ni), A combination comprising at least one of the foregoing can be used, including an alloy of the various metals. The thermally conductive material is further selected so as to not significantly adversely affect catalyst activity, reactor functioning, product yield, or product purity.

The foregoing methods are readily adapted for use in multi-tubular reactors, which can comprise any number of tubes as is known in the art, for example, 1 to 300, specifically, 2 to 250, more specifically, 3 to 200, even more specifically, 1 to 200, yet more specifically, 1 to 150, and even 1 to 100 inner tubes located within an outer tube, often referred to as a "shell." A cooling medium can be located between the shell and the microtube.

Each tube independently can have an average diameter of greater than or equal to 6 millimeters, for example, greater than or equal to 8 millimeters, specifically, greater than or equal to 10 millimeters, and more specifically, greater than or equal to 12 millimeters. Each tube independently can have an average diameter of less than or equal to 500 mm, for example, less than or equal to 250 mm, specifically, less than or equal to 100 mm, more specifically, less than or equal to 50 mm. The cross-sectional shape of the channels can be rectangular, square, round, ovoid, elliptical, or any other regular or irregular geometry. When the shape is not round, the "average microtube channel cross-sectional diameter" refers to the diameter of a circle having the same area as the actual cross-sectional shape.

The location of the catalyst in the reactor can further significantly affect the heat transfer from the reaction to the cooling liquid. Specifically, the catalyst can be deposited on (i.e., can be in direct contact with) a wall of reactor tube. The deposited catalyst is used in combination with a packed bed.

Accordingly, a tube reactor can comprise a shell and a tube located within the shell, with a cooling medium between the shell and the tube, the tube having a particulate catalyst effective to convert carbon monoxide and chlorine to phosgene disposed therein, wherein a thermally conductive material separate from the tube contacts at least a portion of the particulate catalyst, and can optionally provide a thermally conductive path between the particulate catalyst and the tube. The thermally conductive material can have a thermal conductivity of greater than 2 W/(m·K), or greater than 15 W/(m·K), or greater than 100 W/(m·K), or greater than 200 W/(m·K). It can be a coating disposed on at least a portion of an exterior surface of the catalyst particles, or a portion of an exterior surface of agglomerates of the catalyst particles, or both, and can have a coating thickness of 0.001 to 1 micrometer, and the coating can be deposited by chemical vapor deposition, thermal spraying, dip coating, or powder coating. Alternatively, or in addition, the thermally conductive particulate material can be a thermally conductive, 3-dimensional mesh, optionally wherein the openings of the mesh have an average diameter larger than the average diameter of agglomerates of the particulate catalyst; or the thermally conductive material can be a particulate material distributed within and in contact with the particular catalyst, optionally wherein the thermally conductive particulate material and the particulate catalyst are further contacted by a mesh disposed within the tube. The thermally conductive material can be doped in the catalyst in an amount of greater than or equal to 10,000 ppm by weight of the catalyst, or greater than or equal to 100,000 ppm by weight of the catalyst.

A variety of different catalysts that facilitate the reaction between carbon monoxide and chlorine can be used in the above-described methods and reactors. The catalyst can be a carbon-comprising catalyst such as activated charcoal. The carbon can be from, for example, wood, peat, coal, coconut shells, bones, lignite, petroleum-based residues, sugar, and the like, or a combination comprising one or more of the foregoing. The carbon catalyst can be in particulate forms such as powder, granules, pellets, and the like, or a combination comprising one or more of the foregoing. The carbon surface area as determined by Brunauer-Emmett-Teller (BET) measurement can be greater than or equal to 100 square meters per gram ($m^2/g$), specifically, greater than or equal to 300 $m^2/g$, more specifically, greater than or equal to 1,000 $m^2/g$. The carbon surface area as determined by BET measurement can be 100 to 2,000 $m^2/g$, specifically, 550 to 1,000 $m^2/g$. Examples of commercially available carbon catalysts include Barnebey Sutcliffe™, Darco™, Nuchar™, Columbia JXN™, Columbia LCK™, Calgon PCB™, Calgon BPL™, Westvaco™, Norit™, and Barnebey Cheny NB™.

The catalyst can be an oxidatively stable catalyst. "Oxidatively stable" means that the catalyst loses less than or equal to 12 wt % when sequentially heated in air for the following times and temperatures: 125° C. for 30 minutes, 200° C. for 30 minutes, 300° C. for 30 minutes, 350° C. for 45 minutes, 400° C. for 45 minutes, 450° C. for 45 minutes, and finally at 500° C. for 30 minutes. This sequence of time and temperature conditions for evaluating the effect of heating carbon samples in air can be run using thermal gravimetric analysis (TGA).

The catalyst can comprise an active metal content of less than or equal to 1,000 ppm by weight. The active metal can comprise one or more of a transition metal of Groups 3 to 10 of the Periodic Table, boron, aluminum, silicon, or a combination comprising one or more of the foregoing. The catalyst can be free of iron, where free of iron can mean that the catalyst comprises less than or equal to 100 ppm by weight, specifically, 0 to 50 ppm by weight of iron. Likewise, the catalyst can comprise less than or equal to 200 ppm by weight, specifically, less than or equal to 100 ppm by weight of sulfur and/or less than or equal to 200 ppm by weight, specifically, less than or equal to 100 ppm by weight of phosphorus. Carbon catalysts that comprise less than or equal to 1,000 ppm of active metals can be obtained by acid washing (for example, carbons that have been treated with hydrochloric acid or hydrochloric acid followed by hydrofluoric acid).

The catalyst can be a composite carbon comprising a porous carbonaceous material with a three dimensional matrix obtained by introducing gaseous or vaporous carbon-containing compounds (for example, hydrocarbons) into a mass of granules of a carbonaceous material (for example, carbon black); decomposing the carbon-containing compounds to deposit carbon on the surface of the granules; and treating the resulting material with an activator gas comprising steam to provide the porous carbonaceous material. A carbon-carbon composite material is thus formed, which is suitable as a catalyst. Such porous carbon-carbon composites can have a surface area as determined by BET measurement of greater than or equal to 10 $m^2/g$, and can include (1) a micropore to macropore ratio of less than or equal to 3.5, specifically, less than or equal to 2.0, more specifically, less than or equal to 1.0, even more specifically, 0 to 1.0; and (2) a loss of less than or equal to 16% of its weight, specifically, less than or equal to 10% of its weight, more specifically, less than or equal to 5% of its weight when sequentially heated in air for the following times and temperatures: 125° C. for 30 minutes, 200° C. for 30 minutes, 300° C. for 30 minutes, 350° C. for 45 minutes, 400° C. for 45 minutes, 450° C. for 45 minutes, and finally at 500° C.

for 30 minutes. Such a catalyst can comprise an active metal content greater than or equal to 1,000 ppm. The sequence of time and temperature conditions for evaluating the effect of heating carbon samples in air can be run using TGA. The term "micropore" means a pore size of less than or equal to 20 angstroms (Å) and the term "macropore" means a pore size of greater than 20 Å. The total pore volume and the pore volume distribution can be determined, for example, by methods such as porosimetry. The micropore volume (centimeters cubed per gram (cc/g)) can be subtracted from the total pore volume (cc/g) to determine the macropore volume. The ratio of micropores to macropores can then be calculated. Examples of commercially available porous carbons include Calgon X-BCP™ and Calsicat™.

The catalyst can comprise a silicon carbide catalyst. The silicon carbide catalyst can have a surface area as determined by BET measurement of greater than or equal to 10 square meters per gram ($m^2/g$), specifically, greater than or equal to 20 $m^2/g$, more specifically, greater than or equal to 100 $m^2/g$, more specifically, greater than or equal to 300 $m^2/g$. The silicon content can be less than or equal to 10 wt %, specifically, less than or equal to 5 wt %. The silicon carbide catalyst can be manufactured using, for example, a process that comprises contacting silicon monoxide with finely divided carbon (such as one comprising an ash content of less than or equal to 0.1 wt %) or by reacting vapors of silicon monoxide (SiO) with carbon.

Each tube of the reactor can comprise one or more catalyst zones. As described briefly above, when the catalyst is deposited on a surface of a tube, the tube can comprise a first catalyst zone located at or toward the feed end that comprises less catalyst. The tube can further comprise a second catalyst zone located at or toward the outlet end that can comprise the same or different catalyst, at a higher concentration than the first catalyst. The thermally conductive material can be located in the first catalyst zone and/or the second catalyst zone. The two catalyst zones can be sequentially located. Alternatively, the deposition can be gradually increased so that catalyst concentration forms a smooth (for example, a linear or a non-linear gradient) or step gradient along each catalyst zone, with the lower activity being present at the beginning of the first catalyst zone and the higher activity being located at the second catalyst zone.

Alternatively, or in addition, a combination of lower activity catalyst and higher activity catalyst in the packed bed can be used, as described in U.S. Pat. No. 6,500,984. For example, the reactor can comprise a first catalyst zone located at or toward the feed end that comprises a first catalyst having a first activity. The reactor can further comprise a second catalyst zone located at or toward the outlet end that can comprise the same or different catalyst, having a second activity higher than the activity of the first catalyst. The two catalyst zones can be sequentially located. Alternatively, at least a portion of the first catalyst can be intermixed with the second catalyst, such that the activity of the catalyst forms a smooth or step gradient along each catalyst zone, with the lower activity being present at the beginning of the first catalyst zone and the higher activity being located at the second catalyst zone.

As described in KR1998700231A, the reactor can comprise a first catalyst zone located in the feed end that comprises a catalyst diluted with inert filler that does not itself react under the reaction conditions and that does not catalyze or otherwise inhibit the phosgene synthesis reaction. The reactor can further comprise a second catalyst zone located at the outlet end that can comprise the same or different catalyst, which is diluted with less inert filler than in the first catalyst zone. Likewise, the reactor can comprise a first catalyst zone that contains catalyst diluted with inert filler and a second catalyst zone that contains the same or different catalyst that is not diluted with inert filler. The inert filler can be evenly distributed among catalyst particles and the two catalyst zones can be sequentially loaded with catalyst containing inert filler in a first catalyst zone followed by catalyst in a second catalyst zone containing less inert filler. Alternatively, inert filler can be distributed in a gradient among catalyst particles in each catalyst zone with the highest concentration of inert filler being present at the beginning of a first catalyst zone and the concentration of inert filler gradually decreasing until the lowest concentration of inert filler is attained at an end of a second catalyst zone. The inert filler can be distributed in a gradient among catalyst particles in a first catalyst zone with the highest concentration of inert filler being present at the beginning of a first catalyst zone and the concentration of inert filler gradually decreasing until the lowest concentration of inert filler is attained at an end of a first catalyst zone, and the second catalyst zone contains no inert filler. A proportion of catalyst near the outlet or exit point of product gases from a catalyst bed can be undiluted with inert filler, while any remaining portion of catalyst nearer the initial point of contact of catalyst with reactant gases can be diluted with inert filler. Those skilled in the art will realize that the distribution of any filler in any catalyst zone can be homogeneous or in a gradient or somewhere in-between, for example, in a step gradient.

The inert filler can comprise a low porosity material, such as a ceramic, graphite, glassy carbon, glass, quartz, a metal, or a combination comprising one or more of the foregoing. The material can have a porosity of less than or equal to 0.8 pore volume per volume of material (vol/vol), specifically, less than or equal to 0.6 vol/vol, more specifically, 0.1 to 0.5 vol/vol, for example, 0.4 vol/vol. Suitable metals comprise those that are not reactive under the reaction conditions and more specifically that are not reactive toward chlorine, carbon monoxide, or phosgene under the reaction conditions. For example, inert metal fillers can comprise stainless steel; titanium; nickel; metal alloys, including, but not limited to, nickel alloys comprising iron and chromium (such as INCONEL™), or nickel alloys comprising molybdenum and chromium (such as HASTELLOY™); or a combination comprising one or more of the foregoing. Suitable inert fillers are at least substantially inert in that they do not themselves react at an appreciable rate under the reaction conditions and do not catalyze or otherwise inhibit the phosgene synthesis reaction. Substantially inert in the present context means that a filler does not produce a level of byproducts that is outside a specification range for phosgene product.

The carbon monoxide and the chlorine gas used to prepare the phosgene can be high purity grades. The carbon monoxide can be supplied from an on-site generating plant and can comprise trace amounts of impurities such as hydrogen, methane, volatile sulfur compounds, and nitrogen. Recycled carbon monoxide recovered from a phosgene product stream can also be employed as part of the carbon monoxide-comprising feed stream.

The carbon monoxide and the chlorine can be introduced to the reactor in an equimolar amount or in a molar excess of chlorine. For example, the molar ratio of carbon monoxide to chlorine can be 1.00:1 to 1.25:1, specifically, 1.01 to 1.20:1, more specifically, 1.01:1 to 1.21:1, even more specifically, 1.02:1 to 1.12:1, still more specifically, 1.02:1 to 1.06:1.

The initial feed to the reactor can comprise all of the carbon monoxide and all of the chlorine reactants. Likewise, all of the chlorine can be added, where a first amount of carbon monoxide can be introduced to a first stage reaction zone and a second amount of carbon monoxide can be introduced to at least one downstream reaction zone. At least one downstream reaction zone can be in serial communicating relationship with the first reaction zone and the initial molar ratio of carbon monoxide to chlorine can be less than one, specifically, 0.999:1 to 0.2:1, more specifically, 0.999:1 to 0.5:1, even more specifically, 0.999:1 to 0.8:1, more specifically, 0.999:1 to 0.95:1 more specifically, 0.999:1 to 0.98:1.

The reactor can comprise a corrosion resistant material or can be lined with a corrosion resistant material. A corrosion resistant material is one which is essentially inert to chlorine, carbon monoxide, and phosgene (such as ceramic, stainless steel, titanium, nickel, or metal alloys, including, but not limited to, nickel alloys comprising iron and chromium (such as INCONEL), or nickel alloys comprising molybdenum and chromium (such as HASTELLOY)).

The phosgene produced by this method can be used in a variety of industrial processes, for example, the manufacture of polycarbonates, ureas, carbamates, and the like.

In the polymerization of a polycarbonate, a dihydroxy compound can be used as a reactant with phosgene as a carbonate source (also referred to as a carbonate precursor). "Polycarbonate" as used herein means a homopolymer or copolymer having repeating structural carbonate units of formula (1)

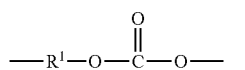

(1)

wherein at least 60 percent of the total number of $R^1$ groups are aromatic, or each $R^1$ contains at least one $C_{6-30}$ aromatic group. Specifically, $R^1$ can be derived from a dihydroxy compound such as an aromatic dihydroxy compound of formula (2) or a bisphenol of formula (3).

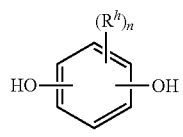

(2)

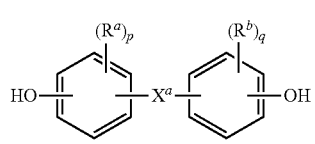

(3)

In formula (2), each $R^h$ is independently a halogen atom, for example, bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In formula (3), $R^a$ and $R^b$ are each independently a halogen, $C_{1-12}$ alkoxy, or $C_{1-12}$ alkyl; and p and q are each independently integers of 0 to 4, such that when p or q is less than 4, the valence of each carbon of the ring is filled by hydrogen. In an embodiment, p and q is each 0, or p and q is each 1, and $R^a$ and $R^b$ are each a $C_{1-3}$ alkyl group, specifically methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group.

Some illustrative examples of specific dihydroxy compounds include the following: bisphenol compounds such as 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis (4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis (hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl) sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole; substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like.

Specific dihydroxy compounds include resorcinol, 2,2-bis (4-hydroxyphenyl) propane ("bisphenol A" or "BPA", in which each of $A^1$ and $A^2$ is p-phenylene and $Y^1$ is isopropylidene in formula (3)), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl)cyclohexane (DMBPC), and 1,1-bis(4-hydroxy-3-methylphenyl)-3,3,5-trimethylcyclohexane (isophorone bisphenol).

"Polycarbonates" as used herein include homopolycarbonates (wherein each $R^1$ in the polymer is the same), copolymers comprising different $R^1$ moieties in the carbonate ("copolycarbonates"), and copolymers comprising carbonate units and other types of polymer units, such as polysiloxane units, ester units, and the like.

The polycarbonate can be made by an interfacial polymerization process or in a melt polymerization process, which can be a continuous melt process. Although the reaction conditions for interfacial polymerization can vary, an exemplary process generally involves dissolving or dispersing a dihydric phenol reactant in aqueous NaOH or KOH, adding the resulting mixture to a water-immiscible solvent medium, and contacting the reactants with a carbonate precursor in the presence of a catalyst such as, for example, a tertiary amine or a phase transfer catalyst, under controlled pH conditions, e.g., 8 to 10. The water immiscible solvent can be, for example, methylene chloride, ethylene dichloride, 1,2-dichloroethane, chlorobenzene, toluene, and the like.

Among tertiary amines that can be used in interfacial polymerization are aliphatic tertiary amines such as triethylamine and tributylamine, cycloaliphatic tertiary amines such as N,N-diethyl-cyclohexylamine, and aromatic tertiary amines such as N,N-dimethylaniline. Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Examples of phase transfer catalysts include $(CH_3(CH_2)_3)_4NX$, $(CH_3(CH_2)_3)_4PX$, $(CH_3(CH_2)_5)_4NX$, $(CH_3(CH_2)_6)_4NX$, $(CH_3(CH_2)_4)_4NX$, $CH_3(CH_3(CH_2)_3)_3NX$, and $CH_3(CH_3(CH_2)_2)_3NX$, wherein X is Cl$^-$, Br$^-$, a $C_{1-8}$ alkoxy group or a $C_{6-18}$ aryloxy group. An effective amount of a phase transfer catalyst can be 0.1 to 10 weight percent (wt %), or 0.5 to 2 wt %, each based on the weight of bisphenol in the phosgenation mixture.

Phosgene can also be used in the synthesis of carbamates and ureas, which can be synthesized by reaction of phosgene with two amines or an amine and an alcohol. Such compounds can be a compound of the formula:

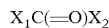

wherein $X_1$ is $NR_1R_2$ and $X_2$ is $NR_3R_4$ or $OR_5$, and wherein $R_1$, $R_2$, and $R_3$ and $R_4$, if present, are each independently hydrogen, optionally-substituted linear or branched alkyl, alkene, cycloalkyl, cycloalkenyl, aryl, heteroatom-containing aryl, and aralkyl groups, or $R_1$ and $R_2$ in combination are a carbon atom double bonded to the nitrogen of $X_1$ or $R_3$ and $R_4$ in combination are a carbon atom double bonded to the nitrogen of $X_2$ or the N of $X_1$ or $X_2$ may be the nitrogen of a ring system, and $R_5$, if present, is selected from the group consisting of optionally-substituted linear or branched alkyl, aryl, and aralkyl groups, or $R_1$ or $R_2$ in combination with $R_3$, $R_4$, or $R_5$ form a five or six-member ring. As is known in the art, the compounds can be synthesized by reacting $HNR_1R_2$ and $HNR_3R_4$ or $HOR_5$ with an ester-substituted diaryl carbonate to form the compound under transesterification conditions. The optional substituents can each independently be chemical functional groups that are not reactive under the transesterification conditions used to prepare the further derivatized carbamate species. Such optional substituents include halogen, vinyl, carbonyl, ether, cycloether, azo, sulfide/thio, alcohol, and heterocyclic substituents. The ester-substituted diaryl carbonate can be bismethylsalicylcarbonate (BMSC). The compound can be subjected to a pyrolysis reaction to form an isocyanate.

Set forth below are some embodiments of the method for making the phosgene, as well as apparatuses for use in the method.

Embodiment 1

A method of producing phosgene in a tube reactor, the method comprising: introducing a feed comprising carbon monoxide and chlorine to a tube of the reactor, the tube having a particulate catalyst disposed therein, wherein a thermally conductive material separate from the tube contacts at least a portion of the particulate catalyst; to produce a product composition comprising phosgene, and carbon tetrachloride in an amount of 0 to 10 ppm by volume based on the volume of the phosgene.

Embodiment 2

The method of Embodiment 1, wherein the thermally conductive material provides a thermally conductive path between the particulate catalyst and the tube.

Embodiment 3

The method of any of Embodiments 1-2, wherein the thermally conductive material comprises a coating disposed on at least a portion of an exterior surface of the particulate catalyst, or a portion of an exterior surface of an agglomerate of the particulate catalyst, or both.

Embodiment 4

The method of Embodiment 3, wherein the coating has a coating thickness of 0.001 to 1 micrometer.

Embodiment 5

The method of any of Embodiments 3-4, wherein the coating is deposited by chemical vapor deposition, thermal spraying, dip coating, or powder coating.

Embodiment 6

The method of any of Embodiments 1-5, wherein the thermally conductive particulate material comprises a thermally conductive, 3-dimensional mesh.

Embodiment 7

The method of Embodiment 6, wherein the mesh has openings and wherein the openings of the mesh have an average diameter larger than the average diameter of the particulate catalyst.

Embodiment 8

The method of any of Embodiments 1-7, wherein the thermally conductive material comprises a particulate material distributed within and in contact with the particulate catalyst.

Embodiment 9

The method of Embodiment 8, wherein the thermally conductive particulate material and the particulate catalyst are contacted by a mesh disposed within the tube.

Embodiment 10

The method of Embodiment 9, wherein the mesh has openings and the openings of the mesh have an average diameter smaller than the average diameter of the thermally conductive particulate material.

Embodiment 11

The method of any of Embodiments 1-10, wherein the thermally conductive material comprises a doping material that is doped in the catalyst in an amount of greater than or equal to 10,000 ppm by weight of the particulate catalyst.

Embodiment 12

The method of Embodiment 11, wherein the doping material is present in an amount of greater than or equal to 100,000 ppm by weight of the particulate catalyst.

Embodiment 13

The method of any of Embodiments 1-12, wherein the thermally conductive material has a thermal conductivity greater than 2 W/(m·K).

Embodiment 14

The method of Embodiment 13, wherein the thermally conductive material has a thermal conductivity greater than 200 W/(m·K).

Embodiment 15

The method of any of Embodiments 1-14, wherein the thermally conductive material comprises aluminum, antimony, beryllium, brass, bronze, cadmium, carbon, copper, gold, iridium, iron, lead, magnesium, molybdenum, nickel, silver, chromium, or a combination comprising at least one of the foregoing.

Embodiment 16

The method of any of Embodiments 1-15, wherein the thermally conductive material comprises steel.

Embodiment 17

The method of Embodiment 16, wherein the steel comprises stainless steel, chrome nickel steel, or a combination comprising one or both of the foregoing.

Embodiment 18

The method of any of Embodiments 15-17, wherein the carbon comprises carbon nanotubes, grapheme, carbon steel, or a combination comprising one or more of the foregoing.

Embodiment 19

The method of any of Embodiments 1-18, wherein the catalyst varies in concentration, activity, or both from a feed end of the tube to an outlet end of the tube, wherein the variance is from low activity, concentration, or both at the feed end to relatively higher concentration, activity, or both, at the outlet end.

Embodiment 20

The method of Embodiment 19, wherein the variance is a smooth gradient.

Embodiment 21

The method of any of Embodiments 1-20, wherein a peak temperature in the reactor is less than 800° C.

Embodiment 22

The method of Embodiment 21, wherein a peak temperature in the reactor is less than or equal to 400° C.

Embodiment 23

The method of any of Embodiments 1-22, wherein the reactor has a heat transfer area per unit volume of 250 to 10,000 m$^2$/m$^3$.

Embodiment 24

The method of Embodiment 23, wherein the reactor has a heat transfer area per unit volume of 500 to 10,000 m$^2$/m$^3$.

Embodiment 25

A tube reactor comprising: a shell and a tube located within the shell, with a cooling medium between the shell and the tube, the tube having a particulate catalyst effective to convert carbon monoxide and chlorine to phosgene disposed therein, wherein a thermally conductive material separate from the tube contacts at least a portion of the particulate catalyst.

Embodiment 26

The reactor of Embodiment 25, wherein the thermally conductive material provides a thermally conductive path between the particulate catalyst and the tube.

Embodiment 27

The reactor of any of Embodiments 25-26, wherein the thermally conductive material comprises a coating disposed on at least a portion of an exterior surface of the particulate catalyst particle, or a portion of an exterior surface of an agglomerate of the particulate catalyst, or both.

Embodiment 28

The reactor of Embodiment 27, wherein the coating has a coating thickness of 0.001 to 1 micrometer.

Embodiment 29

The reactor of any of Embodiments 25-28, wherein the thermally conductive material comprises a thermally conductive, 3-dimensional mesh.

Embodiment 30

The reactor of Embodiment 29, wherein the mesh has openings and wherein the openings of the mesh have an average diameter larger than the average diameter of agglomerates of the particulate catalyst.

Embodiment 31

The reactor of any of Embodiments 25-30, wherein the thermally conductive material comprises a particulate material distributed within and in contact with the particular catalyst.

Embodiment 32

The reactor of Embodiment 31, wherein the particulate material and the particulate catalyst are contacted by a mesh disposed within the tube.

Embodiment 33

The reactor of Embodiment 32, wherein the mesh has openings and wherein the openings of the mesh have an average diameter smaller than the average diameter of the particulate material.

Embodiment 34

The reactor of any of Embodiments 25-33, wherein the thermally conductive material comprises a doping material that is doped in the catalyst in an amount of greater than or equal to 10,000 ppm by weight of the particulate catalyst.

Embodiment 35

The reactor of Embodiment 34, wherein the doping material is present in an amount of greater than or equal to 100,000 ppm by weight of the catalyst.

Embodiment 36

The reactor of any of Embodiments 25-35, wherein the thermally conductive material has a thermal conductivity greater than 2 W/(m·K).

Embodiment 37

The reactor of Embodiment 36, wherein the thermally conductive material has a thermal conductivity greater than 200 W/(m·K).

Embodiment 38

The reactor of any of Embodiments 25-37, wherein the thermally conductive material comprises aluminum, antimony, beryllium, brass, bronze, cadmium, carbon, copper, gold, iridium, iron, lead, magnesium, molybdenum, nickel, silver, chromium, or a combination comprising at least one of the foregoing.

Embodiment 39

The method of Embodiment 38, wherein the thermally conductive material comprises steel.

Embodiment 40

The method of Embodiment 39, wherein the steel comprises stainless steel, chrome nickel steel, or a combination comprising one or both of the foregoing.

Embodiment 41

The method of any of Embodiments 38-40, wherein the thermally conductive material comprises and wherein the carbon comprises carbon nanotubes, grapheme, carbon steel, or a combination comprising one or more of the foregoing.

Embodiment 42

The reactor of any of Embodiments 25-41, wherein the catalyst varies in concentration, activity, or both from a feed end of the tube to an outlet end of the tube, wherein the variance is from low activity, concentration, or both at the feed end to relatively higher concentration, activity, or both, at the outlet end.

Embodiment 43

The reactor of Embodiment 42, wherein the variance is a smooth gradient.

Embodiment 44

The reactor of any of Embodiments 25-43, wherein a peak temperature in the reactor is less than 800° C.

Embodiment 45

The tube reactor of Embodiment 44, wherein a peak temperature in the reactor is less than or equal to 400° C.

Embodiment 46

The reactor of any of Embodiments 25-45, wherein the reactor has a heat transfer area per unit volume of 250 to 10,000 $m^2/m^3$.

Embodiment 47

The reactor of Embodiment 46, wherein the reactor has a heat transfer area per unit volume of 500 to 10,000 $m^2/m^3$.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt %, or, more specifically, 5 wt % to 20 wt %", is inclusive of the endpoints and all intermediate values of the ranges of "5 wt % to 25 wt %," etc.). Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or" unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. In addition, it is to be understood that the described elements can be combined in any suitable manner in the various embodiments.

All references cited herein are incorporated herein by reference in their entirety.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

We claim:

1. A tube reactor comprising:
   a shell and a tube located within the shell, with a cooling medium between the shell and the tube,
   the tube having a particulate catalyst effective to convert carbon monoxide and chlorine to phosgene disposed therein,
   wherein a thermally conductive material separate from the tube contacts at least a portion of the particulate catalyst; and
   wherein the tube reactor is configured such that the peak temperature in the reactor is less than 800° C.;
   wherein the tube reactor has a heat transfer area per unit volume of 500 to 10,000 m$^2$/m$^3$.

2. The reactor of claim 1, wherein the thermally conductive material provides a thermally conductive path between the particulate catalyst and the tube.

3. The reactor of claim 1, wherein the thermally conductive material comprises a coating disposed on at least a portion of an exterior surface of the particulate catalyst particle, or a portion of an exterior surface of an agglomerate of the particulate catalyst, or both, and wherein the coating has a coating thickness of 0.001 to 1 micrometer.

4. The reactor of claim 1, wherein the thermally conductive material comprises a particulate material distributed within and in contact with the particulate catalyst, and the particulate material and the particulate catalyst are contacted by a mesh disposed within the tube.

5. The reactor of claim 4, wherein the mesh has openings and wherein the openings of the mesh have an average diameter smaller than the average diameter of the particulate material.

6. The reactor of claim 1, wherein the thermally conductive material comprises a doping material that is doped in the catalyst in an amount of greater than or equal to 10,000 ppm by weight of the particulate catalyst, and wherein the thermally conductive material has a thermal conductivity greater than 200 W/(m·K).

7. A tube reactor comprising:
   a shell and a tube located within the shell, with a cooling medium between the shell and the tube,
   the tube having a particulate catalyst effective to convert carbon monoxide and chlorine to phosgene disposed therein,
   wherein a thermally conductive material separate from the tube contacts at least a portion of the particulate catalyst; and
   wherein the tube reactor is configured such that the peak temperature in the reactor is less than 800° C.;
   wherein the catalyst varies in concentration, activity, or both from a feed end of the tube to an outlet end of the tube, wherein the variance is from low activity, concentration, or both at the feed end to relatively higher concentration, activity, or both, at the outlet end.

8. The reactor of claim 7, wherein the method has a heat transfer area per unit volume of 500 to 10,000 m$^2$/m$^3$.

9. A method of producing phosgene in the tube reactor of claim 1, the method comprising:
   introducing a feed comprising carbon monoxide and chlorine to a tube of the reactor having a peak temperature of less than 800° C., the tube having a particulate catalyst disposed therein, wherein a thermally conductive material separate from the tube contacts at least a portion of the particulate catalyst; and
   producing a product composition comprising phosgene, and carbon tetrachloride in an amount of 0 to 10 ppm by volume based on the volume of the phosgene.

10. The method of claim 9, wherein the thermally conductive material comprises a coating disposed on at least a portion of an exterior surface of the particulate catalyst, or a portion of an exterior surface of an agglomerate of the particulate catalyst, or both.

11. The method of claim 10, wherein the coating has a coating thickness of 0.001 to 1 micrometer.

12. The method of claim 9, wherein the thermally conductive particulate material comprises a thermally conductive, 3-dimensional mesh, and wherein the mesh has openings and wherein the openings of the mesh have an average diameter larger than the average diameter of the particulate catalyst.

13. The method of claim 9, wherein the thermally conductive material comprises a particulate material distributed within and in contact with the particulate catalyst.

14. The method of claim 9, wherein the thermally conductive material comprises a doping material that is doped in the catalyst in an amount of greater than or equal to 10,000 ppm by weight of the particulate catalyst.

15. The method of claim 9, wherein the thermally conductive material has a thermal conductivity greater than 50 W/(m·K).

16. The method of claim 9, wherein the thermally conductive material comprises aluminum, antimony, beryllium, brass, bronze, cadmium, carbon, copper, gold, iridium, iron, lead, magnesium, molybdenum, nickel, silver, chromium, or a combination comprising at least one of the foregoing.

17. The method of claim 9, wherein the catalyst varies in concentration, activity, or both from a feed end of the tube to an outlet end of the tube, wherein the variance is from low activity, concentration, or both at the feed end to relatively higher concentration, activity, or both, at the outlet end.

18. The method of claim 9, wherein the peak temperature in the reactor is less than or equal to 400° C.

19. The method of claim 9, wherein the thermally conductive material forms a thermally conductive path between the particulate catalyst and the tube; and wherein, during use, the thermally conductive material conducts heat away from the catalyst and/or increases the thermal conductivity of catalyst.

20. The reactor of claim 9, wherein the particulate catalyst comprises a carbon-containing catalyst.

* * * * *